(12) United States Patent
Isaac et al.

(10) Patent No.: US 10,182,525 B2
(45) Date of Patent: Jan. 22, 2019

(54) FEEDER AND HEADER POSITIONING METHOD

(71) Applicant: CNH Industrial America LLC, New Holland, PA (US)

(72) Inventors: Nathan E. Isaac, Lancaster, PA (US); Robert Stewart Boyd, Flowery Branch, GA (US)

(73) Assignee: CNH Industrial America LLC, New Holland, PA (US)

( * ) Notice: Subject to any disclaimer, the term of this patent is extended or adjusted under 35 U.S.C. 154(b) by 44 days.

(21) Appl. No.: 15/597,360

(22) Filed: May 17, 2017

(65) Prior Publication Data

US 2018/0332768 A1 Nov. 22, 2018

(51) Int. Cl.
*A01D 41/14* (2006.01)
*A01D 41/06* (2006.01)
*A01D 57/02* (2006.01)
*A01D 34/04* (2006.01)

(52) U.S. Cl.
CPC ........... *A01D 41/141* (2013.01); *A01D 34/04* (2013.01); *A01D 41/06* (2013.01); *A01D 57/02* (2013.01)

(58) Field of Classification Search
CPC ...... A01D 41/141; A01D 34/04; A01D 41/06; A01D 57/02
See application file for complete search history.

(56) References Cited

U.S. PATENT DOCUMENTS

| 4,141,200 | A | 2/1979 | Johnson |
| 4,507,910 | A | 4/1985 | Thornley et al. |
| 4,944,141 | A | 7/1990 | Orlando et al. |
| 5,653,292 | A | 8/1997 | Ptacek et al. |
| 6,519,923 | B1 | 2/2003 | Cooksey et al. |
| 6,813,873 | B2 | 11/2004 | Allwörden et al. |
| 6,871,483 | B1 | 3/2005 | Panoushek |
| 7,681,382 | B2 | 3/2010 | Viaud |
| 7,870,709 | B2 | 1/2011 | Digman |
| 7,987,656 | B2 | 8/2011 | Ehrhart et al. |
| 7,992,369 | B2 | 8/2011 | Coers et al. |

(Continued)

OTHER PUBLICATIONS

International Search Report and Written Opinion for International Application No. PCT/US2018/032958, dated Jul. 13, 2018 (12 pages).

*Primary Examiner* — Calvin Cheung
(74) *Attorney, Agent, or Firm* — Peter K. Zacharias; Patrick M. Sheldrake

(57) ABSTRACT

A method of operating an agricultural vehicle having a feeder housing and a header. The method includes the steps of providing an automated adjustment system configured for adjusting at least one of: at least one header function, at least one feeder housing function, and at least one agricultural vehicle function. The automated adjustment system includes a controller and a memory operably coupled to the controller. The method includes the further steps of receiving an input from one of an operator manually inputting the input or the header automatically communicating the input, defining an origin position, calibrating an origin pitch angle of the header, adjusting a position of the header, maintaining the origin position, determining a condition, and adjusting or maintaining at least one of the at least one header function, the at least one feeder housing function, and the at least one agriculture vehicle function in response to the condition.

20 Claims, 7 Drawing Sheets

(56) References Cited

U.S. PATENT DOCUMENTS

| | | |
|---|---|---|
| 8,245,489 B2 | 8/2012 | Talbot |
| 8,881,495 B2 | 11/2014 | Lohrentz et al. |
| 8,966,871 B2 | 3/2015 | Nafziger et al. |
| 2004/0006958 A1 | 1/2004 | Thiemann et al. |
| 2014/0041351 A1 | 2/2014 | Bollin et al. |
| 2014/0041352 A1 | 2/2014 | Johnson |
| 2015/0271999 A1 | 10/2015 | Enns et al. |
| 2016/0007531 A1 | 1/2016 | Schlipf et al. |
| 2016/0113200 A1 | 4/2016 | Gofron et al. |

FEEDER AND HEADER POSITIONING METHOD

FIELD OF THE INVENTION

The present invention relates to agricultural vehicles, and, more particularly, to agricultural vehicles which include a feeder housing and a header.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, and an unloading system, e.g., an unloading auger, on the combine is actuated to transfer the grain into the vehicle.

A typical header includes one or more cutters, e.g., cutter bars with reciprocating knives, which cut the crop material that is harvested from the field. Once the crop material is cut, a conveyor system, which is positioned rearwardly of the cutter(s), transports the crop material to the feeder housing. Modern headers generally have cutters and attachments which are specifically optimized to harvest a particular kind of crop material. For example, the header may include a rotating reel with tines or the like to sweep the crop material towards the cutter(s). Alternatively, the header may include snouts and row units instead of a rotating reel and cutter bar(s).

Generally, a header is rigidly mounted to the feeder housing of the agricultural vehicle. Rigidly attached headers typically function effectively under ideal operating conditions, such as level ground and ideal weather conditions. However, with respect to some larger headers and/or in less than ideal conditions, a rigid header may ineffectively gather the crop material. For example, if the ground has undulations or if the crop has fallen over (i.e. become "lodged") the header may miss a portion of the crop material as it cannot respond to specific changes in terrain or crop conditions. Over the course of harvesting an entire field, a rigidly attached header may lead to significant header loss.

To overcome the disadvantages of rigidly mounted headers, some agricultural vehicles have incorporated a movably mounted header such that the elevation, roll, and/or pitch of the header may be adjusted, allowing the header to more aggressively harvest the crop material. A feeder housing may lift the header vertically. Lateral tilt cylinders may be incorporated to roll the header laterally (e.g., tilting left up/right down). An additional hydraulic cylinder may be added to control the pitch of the header (tilting fore/aft). Also, the header may adjust the position of the rotating reel and the angle of its cutter bar(s). For example, in the case of lodged crop material, a header may be lowered and tilted forwardly to pick up crop material which otherwise would have been left on the field. Hence, in various circumstances, including changes to vehicle inclination, ground undulation, or crop condition, a moveable header may greatly reduce header loss compared to a rigidly mounted header.

An operator is generally required to frequently measure, monitor, and adjust the crop cutting and gathering functions of the agricultural vehicle. To obtain an initial pitch angle for a moveable header, an operator may need to estimate or measure this pitch angle with a measuring device (e.g., protractor), relative to the ground and the specific drive tires or tracks of the header. Based from this initial pitch angle, the operator may manually make header pitch adjustments from within the cab or may physically adjust the face-plate adaptor of the feeder housing in order to respond to various operational changes. In addition to adjusting the header pitch, the operator will also monitor and adjust other parameters such as the position of the rotating reel, angle of the cutter bar(s), and the speed of the agricultural vehicle. This perpetual measuring, monitoring, and/or adjusting of the crop cutting and gathering functions may lead to operator fatigue.

What is needed in the art is an agricultural harvester that automates the measuring, monitoring and adjusting of the crop cutting and gathering functions so that the operator may concentrate on other machine functions.

SUMMARY OF THE INVENTION

In accordance with an aspect of the present invention, a method for automatically orienting the header and automatically adjusting the agricultural vehicle, the feeder housing, and the header is provided.

In accordance with another aspect of the present invention, a method of operating an agricultural vehicle having a feeder housing and a header is provided. The method includes the steps of providing a sensor located on the feeder housing and configured to provide a position signal of the feeder housing, a sensor located on the header and configured to provide a position signal of the header, at least one front ground sensor and at least one back ground sensor each located on the header and configured to provide an elevation signal, and an automated adjustment system configured for adjusting at least one of: at least one header function, at least one feeder housing function, and at least one agricultural vehicle function. The automated adjustment system includes a controller and a memory operably coupled to the controller. The method includes the further steps of receiving an input from one of an operator manually inputting the input or the header automatically communicating the input and defining an origin position of the header based on the input and the memory. The origin position of the header includes an origin pitch angle of the header. The method includes the further steps of calibrating the origin pitch angle of the header by comparing the origin pitch angle of the header to the position signal of the feeder housing and to the position signal of the header, adjusting a position of the header to be in accordance with the origin position of the header, and maintaining the origin position of the header. The method includes the further steps of determining a condition based on at least one harvesting situation and adjusting or maintaining at least one of: the at least one header function, the at least one feeder housing function, and the at least one agriculture vehicle function in response to the condition.

In accordance with yet another aspect of the present invention, a method of operating an agricultural vehicle having a feeder housing and a header is provided. The method includes the steps of providing at least one front ground sensor and at least one back ground sensor each located on the header and configured to provide an elevation signal, and an automated adjustment system configured for adjusting at least one of: at least one header function, at least one feeder housing function, and at least one agricultural vehicle function. The automated adjustment system includes a controller. The method includes the further steps of determining a condition based on at least one harvesting situation and adjusting or maintaining at least one of: the at least one header function, the at least one feeder housing function, and the at least one agriculture vehicle function in response to the condition.

In accordance with yet another aspect of the present invention, a method of operating an agricultural vehicle having a feeder housing and a header is provided. The method includes the steps of providing at least one sensor configured to provide a position signal of the feeder housing or the header, and an automated adjustment system configured for adjusting at least one of: at least one header function, at least one feeder housing function, and at least one agricultural vehicle function. The automated adjustment system including a controller and a memory operably coupled to the controller. The method further including the steps of receiving an input from one of an operator manually inputting the input or the header automatically communicating the input and defining an origin position of the header based on the input and the memory. The origin position of the header includes an origin pitch angle of the header. The method further includes the step of calibrating the origin pitch angle of the header by comparing the origin pitch angle of the header to the position signal of the at least one sensor.

An advantage of the method described herein is that it reduces header loss as the header is automatically adjusted in response to changes in the terrain and crop material.

Another advantage of the method described herein is that it reduces operator fatigue caused from frequently monitoring and adjusting the cutting and gathering functions of the header.

Still another advantage of the method described herein is that an operator may more efficiently interchange headers without estimating or measuring a pitch angle for each specific header.

BRIEF DESCRIPTION OF THE DRAWINGS

The above-mentioned and other features and advantages of this invention, and the manner of attaining them, will become more apparent and the invention will be better understood by reference to the following descriptions of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
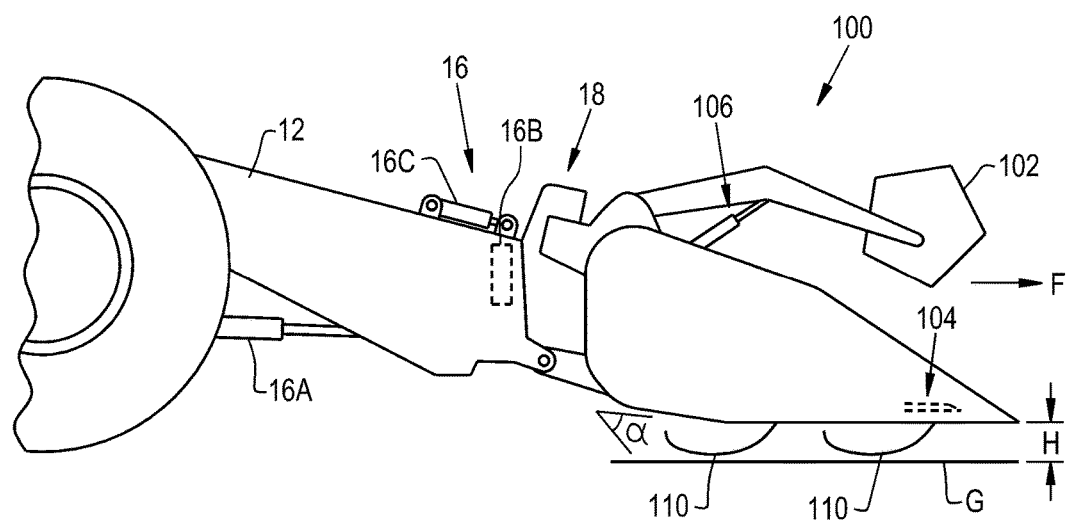
FIG. 1 is a side view of a header in accordance with an exemplary embodiment of the present invention.
Figure 2:
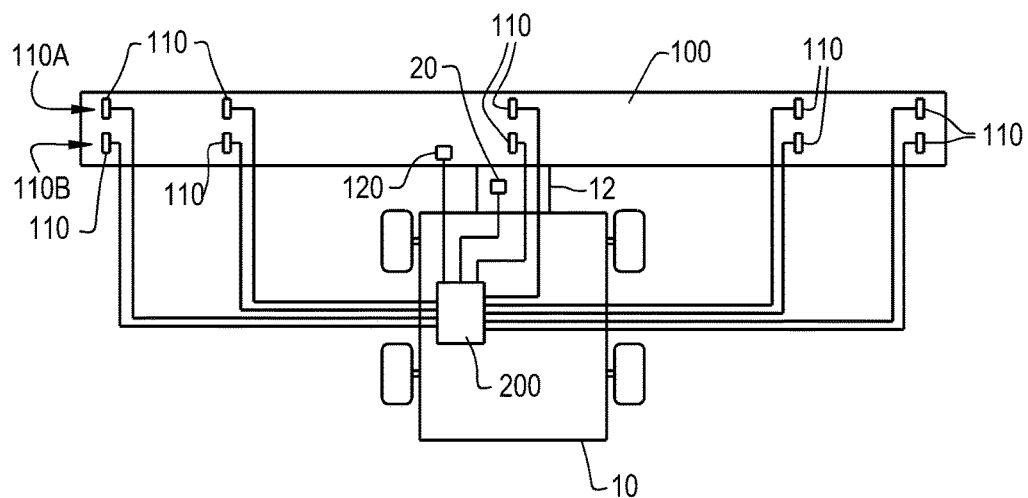
FIG. 2 is a schematic view illustrating an agricultural vehicle having an automatic adjustment system in accordance with the exemplary embodiment of the present invention.
Figure 3:
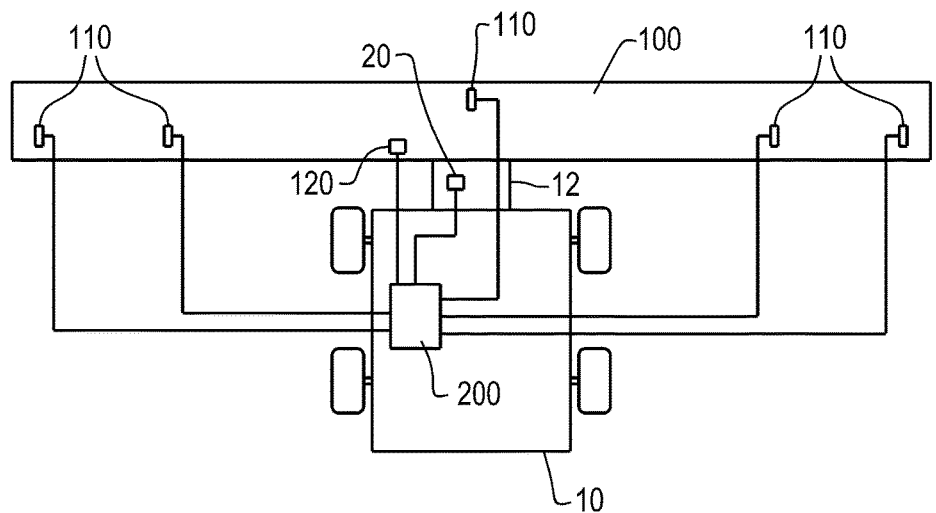
FIG. 3 is a schematic view illustrating an agricultural vehicle having an automatic adjustment system in accordance with the exemplary embodiment of the present invention.

Referring now to the drawings, and more particularly to FIGS. 1-3, there is shown an exemplary embodiment of an automated adjustment system 200 attached to an agricultural vehicle 10 in the form of a combine harvester 10. The combine harvester 10 generally includes a feeder housing 12 and an attachment in the form of a header 100 that is coupled to the feeder housing 12. Typically, the combine harvester 10 will include additional internal systems for the separation and handling of collected crop material, but these additional systems are omitted from view for brevity of description. It should be appreciated that the automated adjustment system 200 described and illustrated herein does not necessarily need to be included on combine harvesters, but can be incorporated in construction vehicles or in other agricultural vehicles, such as windrowers.

The feeder housing 12 may include an actuating system 16, a face plate mount 18, and/or a height sensor 20. The actuating system 16 includes actuators 16A, 16B, and 16C for respectively controlling the elevation (vertical height), lateral tilt (roll), and pitch (fore/aft tilt) of the header 100. Actuator 16A controls the elevation of the feeder housing 12 and thereby the height of the header 100. Actuator 16B controls the lateral tilt of the header 100, and actuator 16C controls the pitch of the header 100. The actuator 16C may adjust the pitch of the header 100 to be plus or minus 5 degrees from an origin or default position; although more or less pitch is feasible, and the degree change in pitch may not necessarily be symmetric about the default position. It should be appreciated that reference to "tilt" and "tilting" of the header 100 herein can refer to both lateral and fore-aft tilting, unless only one of the types of tilt is specified. The actuators 16A, 16B, 16C can be in the form of cylinders that are pneumatically, hydraulically, and/or electrically powered. The actuating system 16 may be linked to the frame of the feeder housing 12, the frame of the header 100, and/or the frame of the agricultural vehicle 10. As shown, the actuating system 16 includes three actuators 16A, 16B, and 16C; however, the actuator system 16 can have two or more than three actuators in order to control the positioning of the frame feeder housing 12 and header 100.

The face plate mount 18 may rigidly or movably couple the header 100 to the feeder housing 12. In the case of moveably mounting the header 100, the header 100 may pivot about a defined axis on the face plate mount 18 or the face plate mount 18 may include a separate actuating system for adjusting the tilt (e.g., lateral and/or fore/aft tilt) of the header 100. The face plate mount 18 may be in the form of a known coupler block that can control the lateral tilt and pitch of the header 100, for example as disclosed in U.S. Pat. No. 6,519,923 which is herein incorporated by reference.

The positional feedback sensor 20 provides a position signal of the feeder housing 12. The positional feedback sensor 20 may be located at any desired position such that the positional feedback sensor 20 can accurately sense the elevation of the feeder housing 12, and thereby the height of the header 100. The feedback sensor 20 may be used in combination with header height sensors if equipped on the header 100. In the exemplary embodiment, there is one sensor 20 located on the feeder housing 12; however, there may be more than one sensor 20, and the sensor 20 may be located on the face plate mount 18. The feedback sensor 20 may be in the form of a known height sensor.

The header 100 includes a frame and a pair of opposed lateral ends. In the exemplary embodiment shown, the header 100 is in the form of a draper header to harvest bushy or fluffy crop material as the header 100 moves in a direction of travel, denoted by arrow "F". The header 100 may include a rotating reel 102 with tines or the like to sweep the crop material inwardly, cutter bar(s) 104 to cut crop material, and a conveyor (e.g., draper belts) to transport crop material to the feeder housing 12. The header 100 may also include an actuating system 106 for adjusting the position of the reel 102 and cutter bar(s) 104. The actuating system 106 may include cylinders that are pneumatically, hydraulically, and/or electrically powered. The actuating system 106 may also incorporate existing linkage mechanisms as used in the Varifeed™ headers of New Holland. As shown the header 100 is moveably attached to the feeder housing 12, and the weight of the header 100 is primarily supported by the agricultural vehicle 10 as the header 100 does not include drive tires or tracks, i.e. gauge wheels or skids. Alternatively, the header 100 may be substantially self-supported, having a pair of laterally disposed gauge wheels or tracks (not shown). The header 100 may also be rigidly attached to the feeder housing 12, and the header 100 may include its own actuating system to adjust its elevation, lateral tilt, and pitch, as disclosed in U.S. patent application Ser. No. 15/262,439 which is herein incorporated by reference. It is conceivable for the header 100 to be in the form of a corn header which includes snouts and row units instead of the reel 102 and cutter bar(s) 104.

The header 100 may also include ground sensors 110 mounted to the frame of the header 100 or on the agricultural vehicle 10. The sensors 110 are configured for sensing a height "H" and providing an elevation signal for the front and back of the header 100 relative to the ground "G". The sensors 110 detect terrain changes, such as undulations in the ground G, that may affect the pitch of the header 100. The ground sensors 110 may be mounted to the underside of the header 100 or at another ideal location, for example the lateral sides of the header 100, such that the sensors 110 can accurately determine the height H at the front and back of the header 100. The ground sensors 110 are shown to be in the form of two rows of sensors 110A and 110B, each row including five sensors 110, which are respectively displaced at the front and back of the header 100 when viewed in the direction of travel F. However, numerous variations of front and back sensors 110, including one front ground sensor 110 and four back ground sensors 110 (FIG. 3) or even one front and one back ground sensor 110, may be used to sense the position of the header 100. The sensors 110 may be located adjacent to the lateral ends of the header and/or may extend across the lateral length of the header 100. The sensors 110 may be in the form of contact or noncontact sensors (e.g., sonar, light emitting/reflectance sensors, etc.). In the exemplary embodiment shown, the ground sensors 110 are in the form of known contact sensors that physically contact the ground G as the header traverses across a field. Known contact sensors include a potentiometer and a cable affixed to a pivoting deflector which deviates its position in accordance with the undulating terrain.

The header 100 may additionally include one or more inclinometer sensor(s) 120 for sensing the lateral tilt and/or the fore/aft tilt of the header 100. The inclinometer sensor 120 provides a position signal of the header 100. In the exemplary embodiment of the present invention, the inclinometer sensor 120 detects the pitch angle α of the header 100 relative to the ground G. The inclinometer sensor 120 may be mounted at a convenient location, and may be set relative to a feature of the header 100, for example a primary supporting beam of the header 100 or the cutter bar plate. The inclinometer sensor 120 may be in the form of a known inclinometer (level) type sensor such as a tilt sensor. The inclinometer sensor 120 is generally fixed in position, but it may be adjusted for tuning.

Referring now to FIG. 4, and FIGS. 1-3 collectively, the automated adjustment system 200 includes a controller 410 and a memory 420. The automated adjustment system 200 is configured to coordinate the header functions 430, the feeder housing functions 440, and the agricultural vehicle functions 450. The header functions 430 of the header 100 may include the positioning and adjustment of the reel height and cutter bar via the actuating system 106. The feeder housing functions 440 of the feeder housing 12 may include the positioning and adjustment of the height, lateral tilt, and fore/aft positions of the header 100 via the actuating systems 16A, 16B, and 16C, respectively. The agricultural vehicle functions 450 of the agricultural vehicle 10 may include the adjustment of the vehicle speed and the combine control systems, such as the threshing, separating, cleaning systems. The automated adjustment system 200 may be a separate unit or it may be incorporated as part of the base system and function of the agricultural vehicle 10. The automated adjustment system 200 is shown to be located on the agricultural vehicle 10; however, it may be located on either of the feeder housing 12 or header 100. For example, the automated adjustment system 200 may be integrated with the header 100 such that the base agricultural vehicle functions are not used.

The controller 410 receives and sends electrical signals to control the various components of the agricultural vehicle 10, the feeder housing 12, and the header 100, which will be described further herein. The controller 410 may be in the form of a CPU or processor, and it may be electrically coupled to or wirelessly communicate with the various sensors, actuators, and other components of the agricultural vehicle 10, feeder housing 12, and/or the header 100. For example, the controller 410 may be electrically coupled to a user interface 460 in order to receive an input from a user. The controller 410 may be electrically coupled to the positional sensor 20, ground sensors 110, and the inclinometer sensor 120 in order to receive the respective signals of the sensors 20, 110, 120. Further, the controller 410 may also be electrically coupled to the actuating systems 16, 106 and/or to an actuating system of the header 100 if it is equipped with its own elevation, lateral tilt, and pitch actuators as discussed above. In the case of pneumatic or hydraulic cylinders, the controller 410 can control one or more valves of the cylinders to fill or drain fluid from within the cylinders, as is known. In the case of electrically powered actuators, the controller 410 may control the mechanisms that cause extension and retraction of the actuators, as is known. Additionally, the controller 410 may be coordinated with an existing feed-rate control system (not shown).

The controller 410 controls the header functions 430 via adjusting the actuating system 106 of the header 100 in response to the signals received from the sensors 110, 120. The controller 410 controls the feeder housing functions 440 by adjusting the actuating system 16 to move the feeder housing 12 and thereby the header 100 according to the terrain changes sensed by the sensors 110, 120. The controller 410 controls the agricultural vehicle functions 450 in accordance with the signals received from the sensors 110, 120 as well as the positional state of the actuating systems 106, 116. For example, the controller 410 may coordinate the functions 430, 440, 450, in response to receiving data signals from the sensors 110 depicting an undulating terrain, by simultaneously decreasing the angle of the cutter bar(s), increasing the pitch angle α of header 100, and lowering the speed of the agricultural vehicle 10.

The memory 420 is operably coupled to the controller 410 and has software that may include an initial settings table, for example, a look-up table 422. The look-up table 422 may contain all of the predefined data corresponding to ideal values of header height, roll, and pitch for initially positioning the header 100. For example, based on a specific type of header and/or a specific type of drive tire or track, the look-up table 422 may contain the predefined ideal operating pitch angle for an initial operating position keyed to the specific header in use. Additionally, the look-up table 422 may also include predefined data corresponding to the known, best operating positions and operational conditions of the feeder housing 12 and agricultural vehicle 10. Alternatively, if the memory 420 does not include a look-up table 422, it may include software with known algorithms that can calculate the ideal, initial operating position of the header 100 based on the specific type of the header and/or drive tire or track type.

Figure 5:
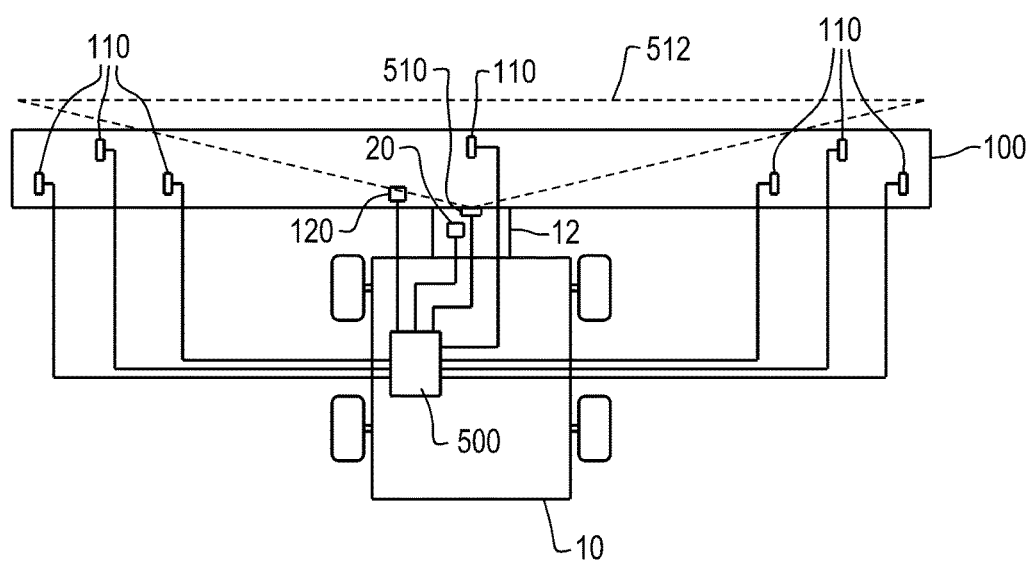
FIG. 5 is a schematic view illustrating an agricultural vehicle having an automatic adjustment system in accordance with an exemplary embodiment of the present invention.
Figure 4:
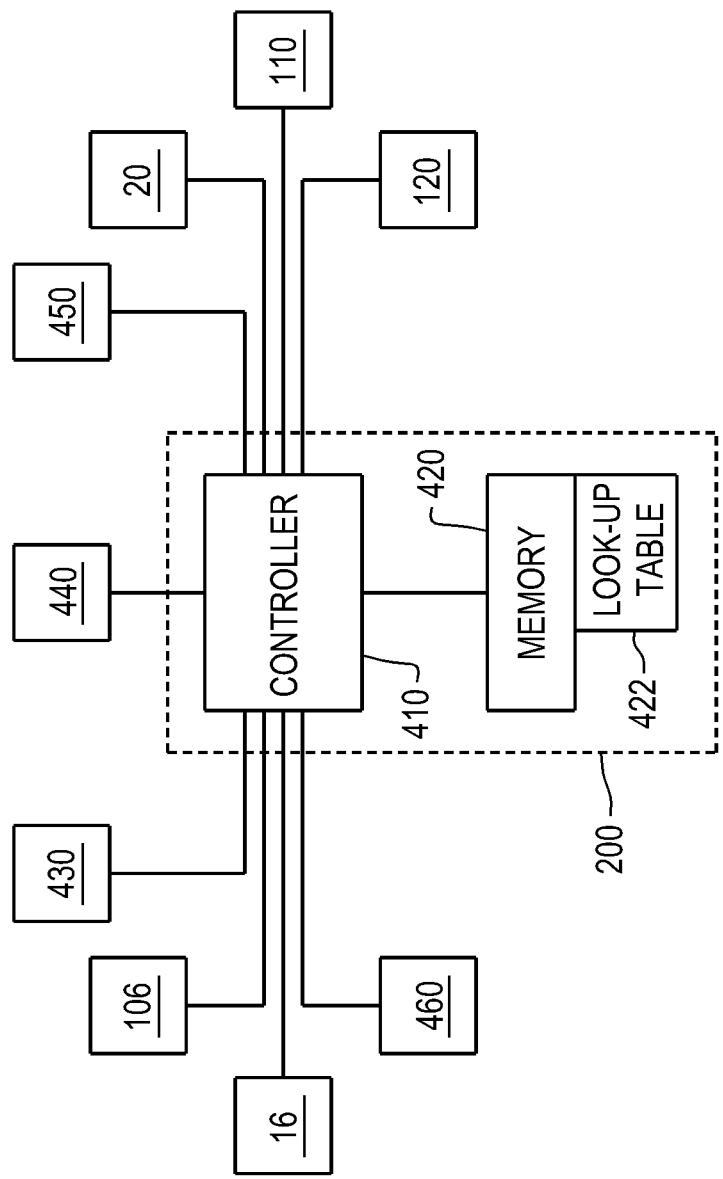
FIG. 4 is a diagram illustrating the automatic adjustment system in accordance with the exemplary embodiment of the present invention as shown in FIGS. 2 and 3.
Figure 6:
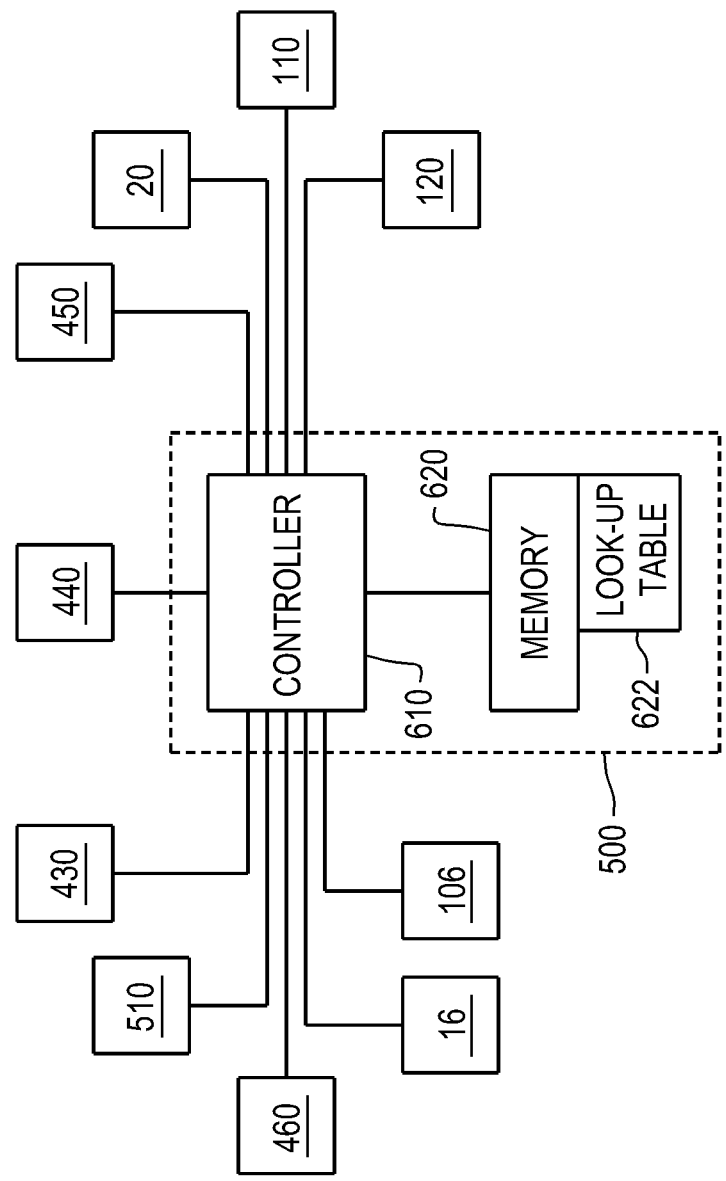
FIG. 6 is a diagram illustrating the automatic adjustment system in accordance with the exemplary embodiment of the present invention as shown in FIG. 5.

Referring now to FIGS. 5-6, there is shown another exemplary embodiment of an automated adjustment system 500 attached to the agricultural vehicle 10 which includes the addition of a crop height sensor 510. Like reference characters indicate identical components identified and described above with respect to the exemplary embodiment as shown in FIGS. 1-3. The automated adjustment system 500 includes a controller 610 and a memory 620 with a look-up table 622. The controller 610 is operably coupled to the crop height sensor 510. The controller 610 and memory 620 may be designed and configured as the controller 410 and memory 420 as discussed above.

The crop height sensor 510 detects a height of the crop material in a swath path and provides a crop height signal to the controller 610 based on a region 512 it senses. Hence, the crop height sensor 510 may determine if and where the crop material has fallen over, i.e. become lodged. The crop height sensor 510 may be mounted on the agricultural vehicle 10, feeder housing 12, or the header 100. The crop height sensor 510 may be incorporated with existing edge guidance systems. The crop height sensor 510 may be in the form of any known noncontact crop height sensor such as a radar crop height detection sensor.

Similar to the controller 410 as described above, the controller 610 may coordinate the functions 430, 440, 450 respectively of the header 100, feeder housing 12, and agricultural vehicle 10 in response to a condition such as a crop change sensed by crop height sensor 510, a terrain change sensed by sensor 110, and/or a user input entered via the user interface 460. Additionally, the controller 610 may be operably coupled to the actuating systems 16, 106 and the sensors 20, 110, 120. Thereby, the controller 610 may perform numerous operational changes such as simultaneously decreasing the height of the rotating reel 102, increasing the pitch angle α of the header 100, and/or lowering the speed of the agricultural vehicle 10.

It should be appreciated that either automated adjustment system 200 or 500 may be incorporated with known Auto-Header Height Control (AHHC) algorithms.

Figure 7:
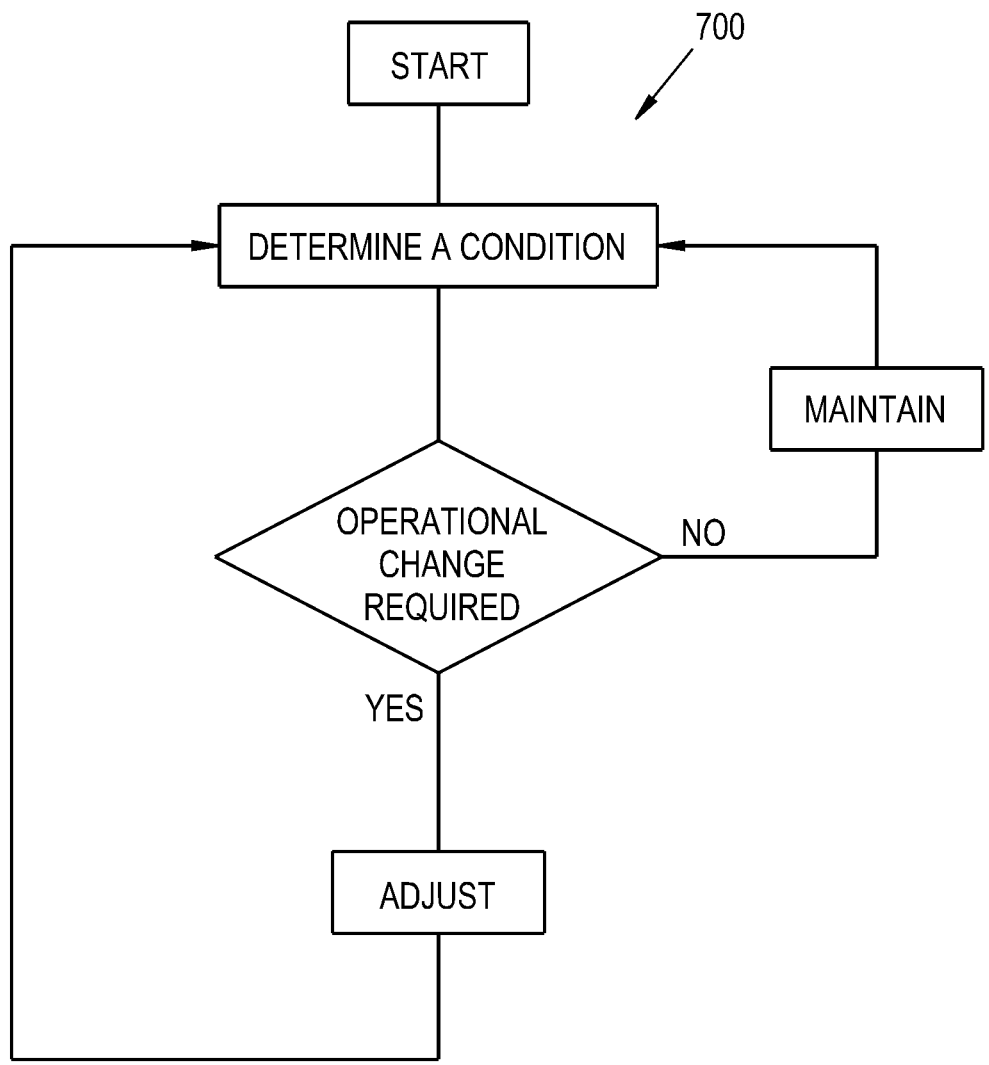
FIG. 7 is a flow diagram illustrating a method in accordance with an exemplary embodiment of the present invention.

Referring now to FIG. 7, there is shown a flow diagram illustrating a method 700 to operate one of the automated adjustment systems 200 or 500. For exemplary purposes only, the method 700 will be described with respect to the embodiment pertaining to the automated adjustment system 500. The method 700 includes the steps of determining a condition based on at least one harvesting situation and either adjusting or maintaining the header 100, feeder housing 12, and/or the agricultural vehicle 10 depending upon whether an operational change is required. A "condition" as used herein refers to a crop condition, a terrain condition, and/or a user input based on a particular harvesting situation. Various harvesting situations may include a sudden dip or incline in the terrain, a change in the height of the crop material, or an operator's input such as a speed adjustment. For example, the controller 610 may determine a crop condition, such as a condition of downed crop material, that is based on a harvesting situation of a sudden change in the height of the crop material. A condition may or may not require an operational change, i.e. an adjustment to the functions 430, 440, and/or 450. The sensors 110 and 510 may be used individually or collectively to respectively sense a condition of the terrain and crop material. The controller 610 receives the signal(s) from the sensors 110 and/or 510 and determines if a condition exists which requires an adjustment of the functions 430, 440, 450. If a condition exists, for example a dip in the terrain, which would thereby necessitate an operational change, then the controller 610 will automatically adjust one or more of the header functions 430, feeder housing functions 440, and agricultural vehicle functions 450. For example, the controller 610 may respond to undulations in the terrain by altering the pitch angle α of the header 100 and maintaining the other functions 440, 450, or the controller 610 may alternatively maintain the pitch angle α of the header 100 and alter the other functions 440, 450. If a condition is determined which does not merit an operational change, for example an unchanged sensor reading in terrain elevation, then a default position of the header 100, feeder housing 12, and agricultural vehicle 10 may be maintained. After adjusting or maintaining the header functions 430, the feeder housing functions 440, and/or the agricultural vehicle functions 450, the method may loop back to the step of determining a condition. It should be appreciated that the sensors 110 and 510 may continually or intermittingly sense and provide a signal to the controller 610.

Figure 8:
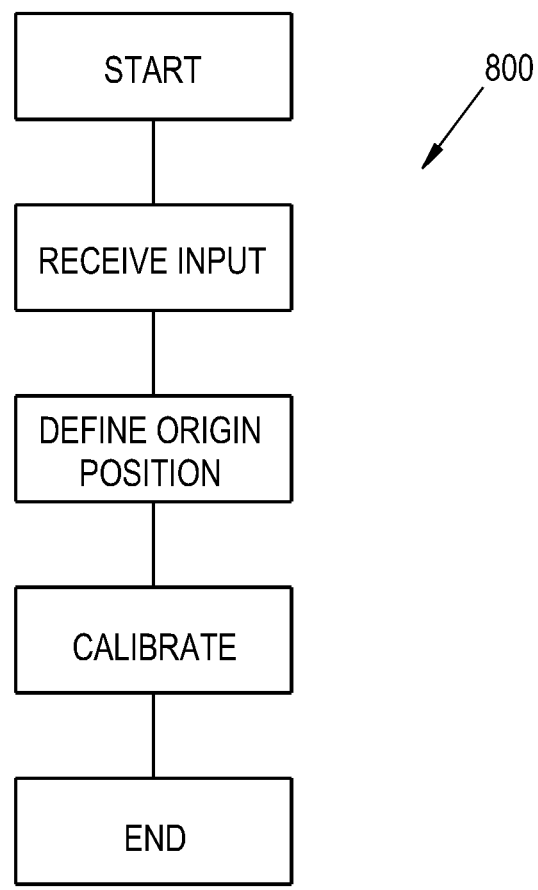
FIG. 8 is a flow diagram illustrating a method in accordance with an exemplary embodiment of the present invention.

Referring now to FIG. 8, there is shown a flow diagram illustrating a method 800 for defining an origin position of an exemplary embodiment of the present invention. For clarity and exemplary purposes only, the method 800 will be described with respect to the embodiment pertaining to the automated adjustment system 500. The method 800 includes the steps of receiving an input, defining an origin or "home" position, and calibrating the origin position. In the step of receiving an input, the controller 610 receives an input regarding a specific header type and/or a gauge element type, such as a drive wheel or drive track type. For example, the controller 610 may receive a model number of the header or drive wheel, or it may receive a specific characteristic of the drive wheel (e.g., wheel diameter). The input may be entered by an operator via the user interface 460 or it may be automatically communicated from the header 100. For example, in the case of an automated transmission, the header 100 may transmit the input to the controller 610 through known electrical connections or through a wireless transmitter in communication with the controller 610 or a combine receiver that is coupled to the controller 610. If the header is self-supporting, the input may be automatically transmitted to the controller 610 by the header or by the gauge element itself. After the controller 610 receives the input, the controller 610 will define the origin position of the header 100. The origin position of the header 100 is the known operational position of best performance specifically in relation to the header 100. The origin position may include one or all of the predetermined header values such as elevation, roll, and/or pitch. Additionally, it is conceivable that the origin position includes the ideal operating parameters of all of the functions 430, 440, 450 respectively of the header 100, feeder housing 12, and agricultural vehicle 10. To obtain the origin position for a particular header, the controller 610 takes the input data and compares it with the look-up table 622 of memory 620 to determine the elevation, roll, and/or pitch value(s) associated with the input data. In the exemplary embodiment of the present invention, the controller 610 determines the predefined, best pitch angle for operating the header 100. In the step of calibrating the origin position, which includes calibrating the origin pitch angle, the controller 610 may confirm the position of the header 100 by comparing it to the signals received from the positional sensor 20 of the feeder housing 12 and/or the inclinometer sensor 120 of the header 100. For example, in calibrating the origin pitch angle, the controller 610 may confirm the defined origin pitch angle by comparing it to the height detected by sensor 20 and to the pitch angle $\alpha$ detected by the inclinometer sensor 120. Calibration may be completed on level or unlevel ground as the sensor 20 of the feeder housing 12 ensures that the header 100 is at the proper position for calibrating the pitch angle. It should be appreciated that only one sensor mounted on either the feeder housing 12 or header 100 may be used for calibration. If only the sensor 20 on the feeder housing 12 is used, the angle of the face plate 18 relative to the ground G versus the voltage response position must be defined as well as a default position. In this case, the sensor 20 would also need to factor in the hysteresis of the system and assume that the agricultural vehicle 10 is on level ground during calibration. It is conceivable for the method 800 to define an origin position of the header 100 without performing the step of calibration. Thereby, as the origin position of the header 100 is automatically defined, an operator does not have to estimate or measure a pitch angle for each specific header used during operation.

Figure 9:
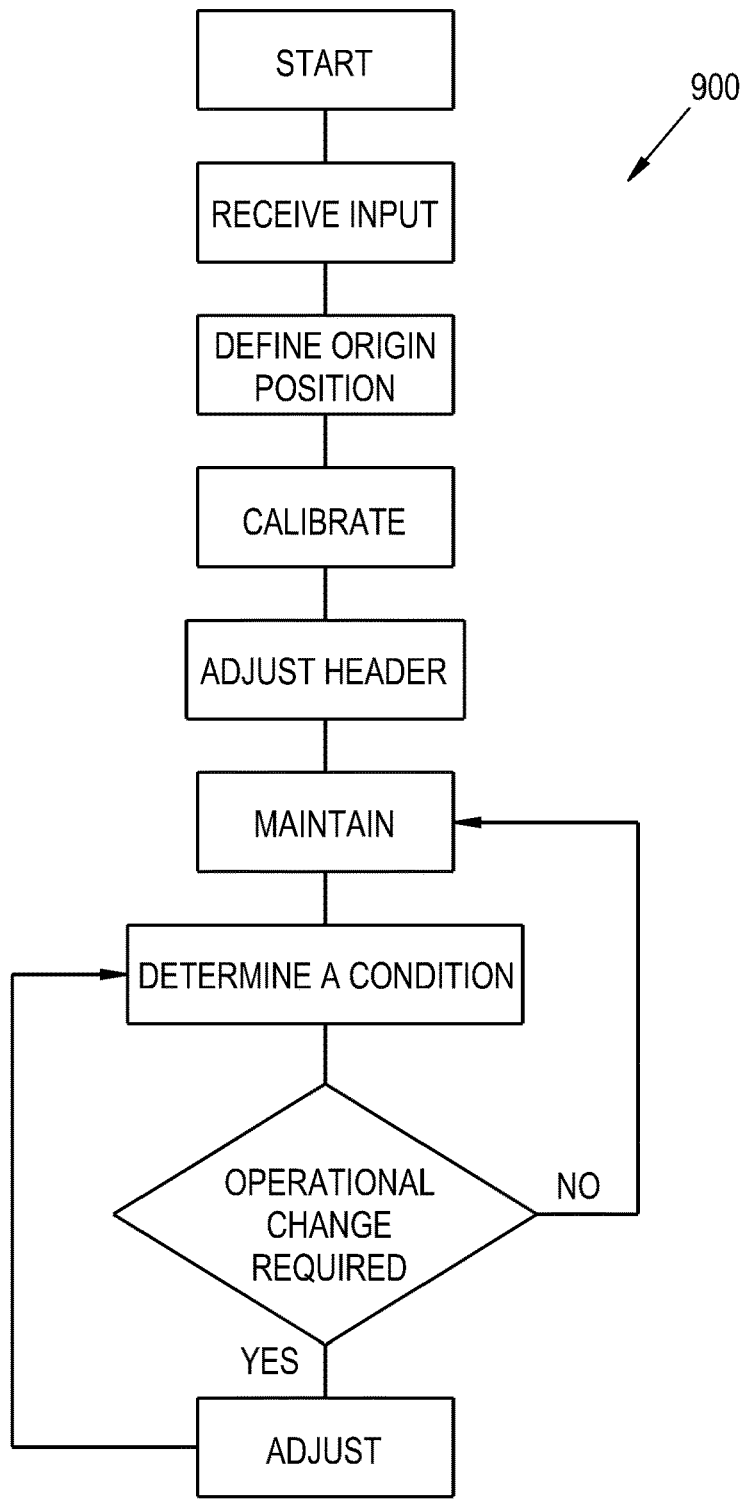
FIG. 9 is a flow diagram illustrating a method in accordance with an exemplary embodiment of the present invention.

Referring now to FIG. 9, there is shown a flow diagram illustrating a method 900 for receiving an input, defining an origin position of the header 100, calibrating the origin pitch angle, maintaining the origin position, and automatically adjusting at least one function 430, 440, 450. The method 900 may be used in either automated adjustment system 200 or 500 as described above; however, for clarity and exemplary purposes only the method 900 will be discussed with respect to the automated adjustment system 500. The method 900 receives an input, defines an origin position, and calibrates the origin pitch angle as described above with respect to the method 800. The method 900 additionally includes the steps of adjusting the header 100 to be in accordance with the defined and calibrated origin position and maintaining the origin position. For example, if the origin position of the header 100 includes a best pitch angle $\alpha$ of operation, then the controller 610 may adjust the header 100 to be in line with the origin pitch angle, and subsequently it may maintain this ideal origin pitch angle as the feeder housing 12 and/or the header 100 is raised or lowered through a range of motion during harvesting. In other words, the software of the controller 610 will maintain the inclinometer sensor 120 at the unique, ideal origin pitch angle for the specific header 100 in use. The method 900 includes the further steps of determining a condition, which may or may not require an operational change, and automatically adjusting or maintaining one or more of the header functions 430, feeder housing functions 440, and agricultural vehicle functions 450. As discussed above with respect to the method 700, the controller 610 determines a condition based on at least one harvesting situation. The condition may include a crop condition, a terrain condition, and/or a user input. If an operational change is required, the controller 610 will adjust the header 100, feeder housing 12, and/or the agricultural vehicle 10. If an operational change is not required, then the header 100, feeder housing 12, and/or the agricultural vehicle 10 will be maintained. For example, upon sensing lodged crop material and an incline in the ground G, the controller 610 may increase the pitch angle $\alpha$ of header 100, which causes the header 100 to deviate from the origin position, and the controller 610 may maintain the operating positions and functions of the feeder housing 12 and agricultural vehicle 10.

Thereby, the agricultural vehicle 10, the feeder housing 12, and the header 100 are automatically adjusted and maintained. Further, the pitch angle $\alpha$ of the header 100 may be adjusted or maintained automatically as the other functions 430, 440, and/or 450 are adjusted or maintained. If desired, a user may manually override and adjust one or more of the functions 430, 440, 450 via the user interface 460. In which case, the controller 610 may automatically adjust or maintain the other functions 430, 440, and/or 450, which were not manually adjusted, in accordance with the user input.

It is to be understood that the steps of the methods 700, 800, 900 can be performed by either of the controllers 410, 610 upon loading and executing software code or instructions which are tangibly stored on the respective tangible computer readable mediums 420, 620. Either memory 420 or 620 may be in the form of a magnetic medium, e.g., a computer hard drive, an optical medium, e.g., an optical disc, solid-state memory, e.g., flash memory, or other storage media known in the art. Thus, any of the functionality performed by the controllers 410, 610 described herein, such as the methods 700, 800, 900, is implemented in software code or instructions which are tangibly stored on a tangible computer readable medium. Upon loading and executing such software code or instructions by the controllers 410, 610, the controllers 410, 610 may perform any of the functionality of the controllers 410, 610 described herein, including any steps of the methods 700, 800, 900 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of operating an agricultural vehicle having a feeder housing and a header, the method comprising the steps of:
    providing a sensor located on the feeder housing and configured to provide a position signal of the feeder housing, a sensor located on the header and configured to provide a position signal of the header, at least one front ground sensor and at least one back ground sensor each located on the header and configured to provide an elevation signal, and an automated adjustment system configured for adjusting at least one of:
        at least one header function,
        at least one feeder housing function, and
        at least one agricultural vehicle function, said automated adjustment system including a controller and a memory operably coupled to the controller;
    receiving an input from one of an operator manually inputting said input or the header automatically communicating said input;
    defining an origin position of the header based on said input and said memory, said origin position of the header including an origin pitch angle of the header;
    calibrating said origin pitch angle of the header by comparing the origin pitch angle of the header to the position signal of the feeder housing and to the position signal of the header;
    adjusting a position of the header to be in accordance with the origin position of the header;
    maintaining the origin position of the header;
    determining a condition based on at least one harvesting situation; and
    adjusting or maintaining at least one of:
        said at least one header function,
        said at least one feeder housing function, and
        said at least one agriculture vehicle function in response to said condition.

2. The method of claim 1, wherein a crop height sensor is also provided and is configured to provide a crop height signal to said controller.

3. The method of claim 2, wherein said condition includes at least one of a terrain condition, a crop condition, and a user input.

4. The method of claim 1, wherein an actuating system is provided on the feeder housing and is configured for adjusting an elevation, a lateral tilt, and a pitch of the header, and said at least one feeder housing function includes an adjustment of at least one of the elevation, the lateral tilt, and the pitch of the header.

5. The method of claim 1, wherein said at least one front ground sensor is in the form of a front row of front ground sensors and said at least one back ground sensor is in the form of a back row of back ground sensors such that said front row of front ground sensors is displaced in front of said back row of back ground sensors in a direction of travel.

6. The method of claim 1, wherein said memory includes a look-up table including at least one ideal value of at least one of a height, a roll, and a pitch angle.

7. The method of claim 6, wherein said origin pitch angle of the header is said pitch angle of said look-up table.

8. The method of claim 1, wherein said input includes at least one of a type of the header, a type of a drive tire, and a type of a track.

9. A method of operating an agricultural vehicle having a feeder housing and a header, the method comprising the steps of:
    providing at least one front ground sensor and at least one back ground sensor each located on the header and configured to provide an elevation signal, and an automated adjustment system configured for adjusting at least one of:
        at least one header function,
        at least one feeder housing function, and
        at least one agricultural vehicle function, said automated adjustment system including a controller;
    determining a condition based on at least one harvesting situation; and
    adjusting or maintaining at least one of:
        said at least one header function,
        said at least one feeder housing function, and
        said at least one agriculture vehicle function in response to said condition.

10. The method of claim 9, wherein a crop height sensor is also provided and is configured to provide a crop height signal to said controller.

11. The method of claim 10, wherein said condition includes at least one of a terrain condition, a crop condition, and a user input.

12. The method of claim 9, wherein an actuating system is provided on the feeder housing and is configured for adjusting an elevation, a lateral tilt, and a pitch of the header, and said at least one feeder housing function includes an adjustment of at least one of the elevation, the lateral tilt, and the pitch of the header.

13. The method of claim 9, wherein said at least one front ground sensor is in the form of a front row of front ground sensors and said at least one back ground sensor is in the form of a back row of back ground sensors such that said front row of front ground sensors is displaced in front of said back row of back ground sensors in a direction of travel.

14. The method of claim 9, wherein said least one front ground sensor and said at least one back ground sensor are each mounted on an underside of the header.

15. A method of operating an agricultural vehicle having a feeder housing and a header, the method comprising the steps of:
provrding at least one sensor configured to provide a position signal of the feeder housing or the header, and an automated adjustment system configured for adjusting at least one of:
at least one header function,
at least one feeder housing function, and
at least one agricultural vehicle function, said automated adjustment system including a controller and a memory operably coupled to the controller;
receiving an input from one of an operator manually inputting said input or the header automatically communicating said input;
defining an origin position of the header based on said input and said memory, said origin position of the header including an origin pitch angle of the header; and
calibrating said origin pitch angle of the header by comparing the origin pitch angle of the header to said position signal of said at least one sensor.

16. The method of claim 15, wherein said at least one sensor includes two sensors in the form a positional sensor located on the feeder housing and configured for sensing a position of the feeder housing and an inclinometer sensor located on the header and configured for sensing a position of the header.

17. The method of claim 16, wherein said step of calibrating said origin pitch angle includes comparing the origin pitch angle of the header to a height of the feeder housing detected by said positional sensor and to a pitch angle of the header detected by said inclinometer sensor.

18. The method of claim 15, wherein said memory includes a look-up table including at least one ideal value of at least one of a height, a roll, and a pitch angle.

19. The method of claim 18, wherein said origin pitch angle of the header is said pitch angle of said look-up table.

20. The method of claim 15, wherein said input includes at least one of a type of the header, a type of a drive tire, and a type of a track.

* * * * *